United States Patent Office 2,735,835
Patented Feb. 21, 1956

2,735,835

STABLE UNSATURATED ORGANIC-SULFUR DI-OXIDE RESINS CONTAINING A SALT OF AN ESTER OF DITHIOPHOSPHORIC AND METHOD OF PREPARING THE SAME

John E. Wicklatz, Bartlesville, Okla., and John Francis Howe, San Diego, Calif., assignors to Phillips Petroleum Company, a corporation of Delaware No Drawing. Application March 7, 1952,
Serial No. 275,471

44 Claims. (Cl. 260—45.75)

This invention relates to the stabilization against decomposition during extrusion molding as well as at elevated temperatures of resins prepared from an unsaturated organic compound and sulfur dioxide by reaction of said compound and said sulfur dioxide under conditions which cause heteropolymerization. In one of its aspects the invention relates to the preparation of a stable resin, as described, by incorporation therein of a stabilizer compound. In another aspect the invention relates to the preparation of a stable resin by incorporation therein of a compound novel for this purpose. In still another aspect the invention relates to the provision of a stabilizer for resins, as described. In a further aspect this invention relates to the stabilization of a resin consisting essentially of the heteropolymer of an unsaturated organic compound and sulfur dioxide, and to the stable resin thus produced, by incorporating into the resin, during its preparation, or thereafter, of a salt of an ester of dithiophosphoric acid.

Olefin-sulfur dioxide resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as addition compounds for the olefin-sulfur dioxide resins. These addition compounds include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence. More recently it has been disclosed that sulfhydryl compounds such as mercapto ethanol, thioglycollic acid, benzyl mercaptan and the like impart thermal stability to said resins. However, these compounds are malodorous and are undesirable in commercial products. In addition those compounds are often not readily available.

We have now discovered that the incorporation of salts of esters of dithiophosphoric acid in unsaturated organic compound-sulfur dioxide resins, i. e. so-called olefin-sulfur dioxide resins, provides a marked improvement in the thermal stability of the resins and renders them highly resistant to thermal decomposition. These stabilizing materials have the following structural formula and may be named as derivatives of dithiophosphoric acid or as metal O,O'-dialkyl thionothiolophosphates:

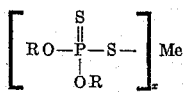

wherein Me is a metal from group I-A, such as Li, Na, K; II-A, such as Mg, Ca, Ba; II-B, such as Zn, Cd, Hg; IV-B such as Pb and Sn of the Mendeleeff Periodic Table; $x$ is equal to the valence of Me; and R can be an alkyl group containing from 1 to 16 carbon atoms such as methyl, ethyl, tertiary butyl, secondary hexyl, normal octyl, tertiary octyl, tertiary dodecyl, secondary tridecyl, tertiary hexadecyl, or the like; an aryl or substituted aryl group containing from 6 to 16 carbon atoms such as phenyl, tolyl, ethylphenyl, tertiary butylphenyl, ditertiary butylphenyl, hexylphenyl, secondary octylphenyl, naphthyl, methylnaphthyl, tertiary butylnaphthyl, and the like; and a cycloalkyl or substituted cycloalkyl containing not more than 16 carbon atoms and preferably containing 5 or 6 carbon atoms in the cycloalkyl ring such as cyclopentyl, cyclohexyl, methylcyclopentyl, ethylcyclopentyl, dimethylcyclopentyl, tertiary butylcyclopentyl, methylcyclohexyl, isopropylcyclohexyl, secondary butylcyclohexyl, normal heptylcyclohexyl, ethylpropylcyclohexyl and the like. The stabilizers of the invention are well-known chemical compounds and can be prepared by methods described in the literature. Certain of the stabilizers of our invention, such as zinc dihexyl dithiophosphate, are available commercially, either in relatively pure or dilute form, and are known in the trade under the trademark Aerolube.

The quantity of stabilizer employed is usually from 0.05 to 10, preferably 0.5 to 5 weight per cent, based on the weight of the dry resin.

The olefin-sulfur dioxide resins can be prepared by reacting sulfur dioxide with various unsaturated organic compounds, according to methods known in the art. Unsaturated organic compounds which can be employed are, for example, monoolefins and substituted monoolefins such as the normal butenes, pentenes, octenes, 4-cyclohexylbutene-1, and the like, cycloolefins such as cyclohexene, conjugated diolefins such as butadiene, acetylenes, and polyfunctional unsaturated compounds such as allyl alcohol, vinyl acetate, allyl ethyl ether, ortho-allyl-anisole, ortho-allylphenol, para-bromoallylbenzene, methyl undecylenate, undecylenyl alcohol, undecylenic acid, acrylonitrile, etc. Mixtures of these olefins can also be employed to prepare the olefin-sulfur dioxide resins. Generally the unsaturated organic compound or olefin which is used in the preparation of the so-called olefin-sulfur dioxide resin will have a point of unsaturation between two adjacent carbon atoms. The resins can be prepared by various methods, for example, by reacting sulfur dioxide with an olefin in the presence of an excess of the sulfur dioxide. The reaction can also be carried out in the presence of acetone or other suitable solvent as a reaction medium. Another, and often preferred, method of preparing the resins is by the emulsion polymerization of the olefin and the SO2 as described in copending application Serial No. 8,755, filed February 16, 1948, by Willie W. Crouch and Ernest W. Cotten, Patent No. 2,645,631, issued July 14, 1953.

While the stabilizers can be incorporated in the resin in any suitable manner, it is important that they be thoroughly and intimately mixed with the resin to provide the maximum stabilizing effect. For example, the stabilizers can be thoroughly admixed with finely divided, powdered resin. If desired, the stabilizers can be dissolved in a suitable solvent such as benzene, methylcyclohexane, paraffins such as heptane and higher boiling and the like, and this solution admixed with the resin. When the resins are prepared by polymerization in aqueous emulsion, the stabilizers may be added directly to said emulsion prior to coagulation of the resins. Upon coagulation of this latex containing the stabilizer, a resin is obtained which contains said stabilizer in a very finely and uniformly dispersed form. In some instances it may be desirable to dissolve the stabilizer in a solvent such as benzene or other suitable solvent, prepare an aqueous emulsion of this solution using sodium lauryl sulfate or other suitable emulsifying agent, and add this emulsion to the latex prior to coagulation. When adding the stabilizer to the latex in any manner, it is highly desirable to maintain the mixture well agitated to insure satisfactory dispersion of the stabilizing agent. It should be understood that it is necessary to provide a thorough and uniform dispersion of the stabilizer throughout the resin, but that the method of incorporation is of less importance.

The stabilizing properties of the dithiophosphoric acid derivatives are illustrated in the following examples. The resins were tested for thermal stability in the following manner: Weighed portions of stabilizer and unstabilized resin were placed in suitable test tubes which were then partially immersed in a constant temperature bath for varying periods of time. The thermal stability is measured by the per cent loss in weight of the resin determined at the end of the heating period. The quantity of stabilizer employed is given in weight per cent based on the dry resin.

EXAMPLE I

An olefin-sulfur dioxide resin was prepared in a stainless steel autoclave employing the following emulsion recipe:

Ingredients                           Parts by weight
Commercial 1-butene [1] _____ 57.7
Sulfur dioxide _____ 88.3
Water _____ 180
Ammonium nitrate_____ 0.5
Marprofix MM [2] _____ 0.6

[1] The commercial 1-butene contained 63.2 mol per cent 1-butene with the remainder being other $C_3$ and $C_4$ hydrocarbons.
[2] Sodium lauryl sulfate dispersing agent commercially available in the form of a paste containing about 60 per cent solids.

The polymerization was conducted for a period of 7 hours at a temperature of 100° F. A conversion of 95 per cent was reached. At the end of the reaction period the reactor was opened and excess sulfur dioxide was vented. The latex was coagulated and the resin was then separated by filtration and dried in air at 130–150° F. for 16 hours.

The results of tests on unstabilized and stabilized resins which are recorded in the following table were obtained on resins coagulated with magnesium sulfate. The stabilizer was added to the dry resin, in the amounts indicated, in benzene solution.

|  | Percent Loss of Weight After Heating at 325± 2° F. | | |
|---|---|---|---|
|  | 0.5 hrs. | 1 hr. | 3 hrs. |
| Control (no stabilizer added) | 5.6 | 9.4 | 15.9 |
| 2% Zn O,O'-dihexyl thionothiolophosphate | 0.8 | 1.0 | 1.8 |
| 2% Aerolube 76 [1] | 1.0 | 1.4 | 2.4 |
| 1% Zn O,O'-dihexyl thionothiolophosphate | 0.8 | 1.0 | 2.0 |
| 1% Aerolube 76 [1] | 1.0 | 1.3 | 2.5 |

[1] Composition commercially available which contains Zn dihexyl dithiophosphate.

The zinc O,O'-dihexyl thionothiolophosphate (also called zinc dihexyl dithiophosphate) was prepared by adding normal hexanol to a suspension of phosphorous pentasulfide in benzene. The mixture was refluxed until there was no further evolution of hydrogen sulfide. Toward the end of the reaction period nitrogen was bubbled through the refluxing mixture to remove the last traces of hydrogen sulfide. After the reaction mixture was cooled, zinc carbonate and a small amount of decolorizing charcoal was added. This mixture was refluxed for a short period of time and then cooled and filtered to remove charcoal. Benzene was removed by vacuum distillation of the solution. The product was a yellow oil obtained in a yield of approximately 81 per cent.

The same procedure can be used to prepare the various esters mentioned above by employing the corresponding alcohol such as tertiary butyl alcohol, tertiary dodecyl alcohol, cyclohexyl alcohol, etc. A metal oxide can be used instead of a metal carbonate to convert the esterified acid to the metallic salt.

EXAMPLE II

A 1-butene-sulfur dioxide resin was prepared as described in Example I, but was coagulated with methanol. The stabilizers which were tested were dissolved in benzene in a ratio of one part per ten parts of benzene. The benzene solution was emulsified in 20 parts of 0.5 weight per cent aqueous Maprofix MM[1] solution and this emulsion was then added to the latex to provide the quantity of stabilizer indicated in the following table:

|  | Percent Loss of Weight After Heating at 325± 2° F. | | |
|---|---|---|---|
|  | 0.5 hrs. | 1 hr. | 3 hrs. |
| Control (no stabilizer added) | 0.5 | 9.4 | 14.0 |
| 2% Zn O,O'-dihexyl thionothiolophosphate | 0.9 | 1.3 | 2.1 |
| 2% Aerolube 76 [1] | 0.7 | 1.1 | 2.4 |
| 1% Zn O,O'-dihexyl thionothiolophosphate | 0.5 | 0.7 | 1.8 |
| 1% Aerolube 76 [1] | 0.7 | 1.2 | 2.6 |

[1] See Example I.

EXAMPLE III

Various metal salts of the dihexyl esters of the dithiophosphoric acid were evaluated as stabilizers. A 1-butene-sulfur dioxide resin prepared as in Example I, but coagulated with methanol was employed. The additives were dissolved in benzene and this solution was added to the dry resin to provide the quantity shown in the following table:

|  | Percent Loss of Weight After Heating at 325± 2° F. | | |
|---|---|---|---|
|  | 0.5 hrs. | 1 hr. | 3 hrs. |
| Control (no stabilizer added) | 5.7 | 10.4 | 17.7 |
| 2% Zn O,O'-dihexyl thionothiolophosphate | 0.5 | 0.8 | 1.9 |
| 2% Na O,O'-dihexyl thionothiolophosphate | 0.5 | 1.2 | 4.1 |
| 2% Mg O,O'-dihexyl thionothiolophosphate | 0.4 | 0.9 | 2.0 |
| 2% Pb O,O'-dihexyl thionothiolophosphate | 1.0 | 1.4 | 2.6 |

EXAMPLE IV

A 1-butene-sulfur dioxide resin was prepared as in Example I, but was coagulated with methanol. Three commercial compositions which contain zinc salts of esters of dithiophosphoric acid were tested as stabilizers. The materials were dissolved in benzene and a quantity of this solution added to the dry resin to provide the concentrations shown in the following table:

|  | Percent Loss of Weight After Heating at 325± 2° F. | | |
|---|---|---|---|
|  | 0.5 hrs. | 1 hr. | 3 hrs. |
| Control (no stabilizer added) | 6.2 | 9.0 | 14.4 |
| 2% Aerolube 70 [1] | 1.3 | 1.9 | 2.9 |
| 2% Aerolube 76 [2] | 0.5 | 1.1 | 2.6 |
| 2% Aerolube 78 [3] | 0.3 | 0.9 | 2.2 |

[1] Aerolube 70 is zinc dihexyl dithiophosphate.
[2] See Example I.
[3] Composition commercially available which contains Zn dihexyl dithiophosphate.

EXAMPLE V

A 1-butene-sulfur dioxide resin was prepared as in Example I and coagulated with magnesium sulfate. Stabilizers were dissolved in an equal weight of benzene and this benzene solution emulsified in an equal weight of 1% Maprofix MM[1] solution. The emulsion was added to the latex prior to coagulation. Results of stability tests are as follows:

| | Percent Loss of Weight After Heating at 325± 2° F. | | |
|---|---|---|---|
| | 0.5 hrs. | 1 hr. | 3 hrs. |
| Control (no stabilizer added) | 5.4 | 8.8 | 15.1 |
| 1% Aerolube 70 [1] | 0.4 | 0.6 | 1.3 |
| 1% Aerolube 76 [2] | 0.7 | 1.1 | 1.8 |
| 0.5% Aerolube 76 [2] | 0.1 | 0.3 | 1.0 |

[1] See Example IV.
[2] See Example I.

EXAMPLE VI

A cyclohexene-sulfur dioxide resin was prepared according to the following emulsion recipe:

Ingredients Parts by weight
 Cyclohexene _____ 56.8
 Sulfur dioxide _____ 78.2
 Water _____ 180.0
 Maprofix MM[1] _____ 1.0
 Ammonium nitrate _____ 0.5

[1] See Example I.

The reaction was continued for six hours at 10° C. Methanol was added to the stirred latex, the precipitated resin was filtered and washed twice with distilled water. The resin was dried in an air draft oven for 24 hours at 130–140° F. At the end of this reaction period the conversion was 88.7 per cent. The stabilizer was added to one portion of the latex, prior to coagulation, by the following procedure.

Aerolube 76 [1] was dissolved in benzene and the benzene solution was emulsified in an 0.5 per cent Orvus [2] solution. This emulsion was added to the stirred latex prior to the coagulation.

| | Percent Loss of Weight After Heating at 325± 2° F. | | |
|---|---|---|---|
| | 0.5 hrs. | 1 hr. | 3 hrs. |
| Control (no stabilizer added) | 3.8 | 6.3 | 15.3 |
| 2% Aerolube 76 | 1.1 | 2.4 | 8.3 |

[1] See Example IV.
[2] Sulfated fatty alcohol surface active agent.

EXAMPLE VII

A butadiene-sulfur dioxide resin was prepared using the following emulsion recipe:

Ingredients Parts by weight
 1,3-butadiene _____ 46.7
 Sulfur dioxide _____ 88.3
 Water _____ 180.0
 Maprofix MM[1] _____ 2.0
 Ammonium nitrate _____ 0.5

[1] See Example I.

The polymerization was carried out at 30° C. for four hours. The resin was found to be totally coagulated at the end of this period. Conversion of the diolefin was 100 per cent. The resin was filtered and washed three times with distilled water and then dried in an air draft oven for 24 hours at 130–140° F. A sample of this resin was stabilized by adding Aerolube 76 in benzene solution to the dry resin. Results were as follows:

| | Percent Loss of Weight After Heating at 467± 2° F. | | |
|---|---|---|---|
| | 0.5 hrs. | 1 hr. | 3 hrs. |
| Control (no stabilizer added) | 15.2 | 28.2 | 47.2 |
| 2% Aerolube 76 [1] | 13.5 | 21.3 | 41.8 |

[1] See Example IV.

EXAMPLE VIII

Stability tests were made on olefin-$SO_2$ resins prepared from (1) a 1-butene blend; (2) a mixture of 1-butene blend and various acrylates; and (3) 1-butene blend, acrylate and a stabilizer. These decomposition tests were carried out at 375° F. The 1-butene blend employed in these additional tests contained 69.9 weight percent 1-butene. The stabilizers were dissolved in benzene and a quantity of the solution added to the dry powdered resin to provide the concentrations indicated. After thorough mixing of the solution and resin powder, the benzene was evaporated.

*Rates of decomposition of polysulfones prepared from mixtures of 1-butene and various acrylates*

| Resin | Percent Loss in Weight at End of X Hours' Heating at 375 ±2° F. | | |
|---|---|---|---|
| | .5 | 1.0 | 3 |
| Control (1-butene blend) [1] | 16.8 | 23.9 | 40.5 |
| 90% blend/10% methyl acrylate | 8.3 | 12.6 | 26.5 |
| 90% blend/10% methyl acrylate + 2% Zn di-n-hexyl dithiophosphate | 1.7 | 2.3 | 6.1 |
| 90% blend/10% ethyl acrylate | 7.9 | 11.1 | 25.7 |
| 90% blend/10% ethyl acrylate + 2% Zn di-n-hexyl dithiophosphate | 1.5 | 2.4 | 6.6 |
| Control (1-butene blend) | 16.6 | 23.7 | 38.8 |
| 90% blend/10% butyl acrylate | 10.8 | 15.1 | 25.3 |
| 90% blend/10% butyl acrylate + 2% Zn di-n-hexyl dithiophosphate | 2.1 | 3.0 | 7.8 |
| 90% blend/10% octyl acrylate | 9.6 | 15.1 | 28.0 |
| 90% blend/10% octyl acrylate + 2% Zn di-n-hexyl dithiophosphate | 1.9 | 3.2 | 10.5 |
| Control (technical 1-butene) [2] | 19.8 | 27.3 | 40.3 |
| Technical 1-butene + 2% Zn di-n-hexyl dithiophosphate | 2.2 | 4.3 | 15.8 |
| Technical 1-butene + 2% Zn diisopropyl dithiophosphate | 3.4 | 5.4 | 12.8 |
| Technical 1-butene + 2% Zn di-n-octyl dithiophosphate | 2.1 | 3.5 | 14.5 |

[1] 1-butene blend contains 69.9 percent 1-butene and a total of unsaturated $C_4$ hydrocarbons of 84.0 percent, with the remainder being normal and isobutane.
[2] Contains a minimum of 95 percent 1-butene (mol percent).

The recipes which were employed to prepare the resins are shown in the following table (parts by weight):

| Ingredient | R=Methyl | R=Ethyl | R=Butyl | R=Octyl |
|---|---|---|---|---|
| R Acrylate | 4.3 parts | 4.7 parts | 4.8 parts | 4.8 parts. |
| 1-Butene blend | 51.2 parts | 50.1 parts | 51.7 parts | 52.0 parts. |
| $SO_2$ | 98.3 parts | 98.3 parts | 99.3 parts | 98.3 parts. |
| $H_2O$ | 220 parts | 220 parts | 220 parts | 220 parts. |
| $NH_4NO_3$ | 1.0 parts | 1.0 parts | 1.0 parts | 1.0 parts. |
| Maprofix MM | 1.5 parts | 0.8 parts | 0.8 parts | 1.5 parts. |
| Time | 6 hrs | 7 hrs | 6 hrs | 6 hrs. |
| Temperature | 100 F | 100 F | 100 F | 100 F. |
| Coagulant | MeOH | NaCl+MeOH | NaCl+MeOH | MeOH. |
| Conversion | 93% | 72.5% | 82% | 92.5%. |

The control resins prepared from 1-butene blend (identified above) were prepared in a manner similar to that shown in the preceding table but did not employ any additional copolymerizable material.

Variation and modification are possible within the scope of the foregoing disclosure and the appended claims to the invention, the essence of which is that certain salts of certain esters of dithiophosphoric acid have been incorporated into so-called olefin-sulfur dioxide resins, as described, and that the said compositions have been found to be stable in respect of thermal and extrusion decomposition.

We claim:

1. A thermally stable heteropolymeric resin of an unsaturated organic compound containing aliphatic unsaturation and sulfur dioxide containing a metal salt of an ester of dithiophosphoric acid in an amount effective to impart stability to the composition thus produced.

2. A production according to claim 36 wherein the stabilizer is added to the dry resin.

3. A production according to claim 36 wherein the stabilizer is added to a latex containing said resin.

4. A production according to claim 36 wherein the stabilizer is added to the mass obtained after a coagulation of the resin in the latex and before separation of coagulated resin therefrom.

5. A production according to claim 36 wherein the resin is one produced from 1-butene and sulfur dioxide by emulsion polymerization.

6. A thermally stable heteropolymeric resin of an unsaturated organic compound containing aliphatic unsaturation and sulfur dioxide containing a material represented by the formula

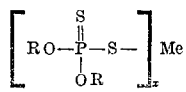

wherein Me is a metal selected from groups I–A, II–A, II–B and IV–B of the Mendeleeff Periodic Table of the elements, $x$ is equal to the valence of said metal; R is at least one member selected from the group consisting of an alkyl group, containing from 1–16 carbon atoms; an aryl group containing from 6–16 carbon atoms; a substituted aryl group, containing from 6–16 carbon atoms; a cycloalkyl group, containing not more than 16 carbons; and a substituted cycloalkyl group, containing not more than 16 carbon atoms in an amount sufficient to impart stability to the composition thus produced.

7. A thermally stable resin composition comprising a 1-butene sulfur dioxide resin and a material represented by the formula

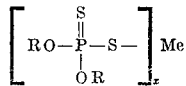

wherein Me is a metal selected from groups I–A, II–A, II–B and IV–B of the Mendeleeff Periodic Table of the elements, $x$ is equal to the valence of said metal; R is at least one member selected from the group consisting of an alkyl group, containing from 1–16 carbon atoms; an aryl group containing from 6–16 carbon atoms; a substituted aryl group, containing from 6–16 carbon atoms; a cycloalkyl group, containing not more than 16 carbons; and a substituted cycloalkyl group, containing not more than 16 carbon atoms in an amount sufficient to impart stability to the composition thus produced.

8. A thermally stable resin composition comprising a 1-butene sulfur dioxide resin and as a stabilizer therefor a sodium salt of an ester of dithiophosphoric acid in an amount sufficient to impart thermal stability to the composition.

9. A thermally stable resin composition comprising 1-butene acrylate sulfur dioxide resin and as a stabilizer therefor a sodium salt of an ester of dithiophosphoric acid in an amount sufficient to impart thermal stability to the composition.

10. A thermally stable resin composition comprising an olefin+$SO_2$ resin and, as a stabilizer therefor, a zinc salt of dihexyl dithiophosphate in an amount sufficient to impart thermal stability to the composition.

11. A thermally stable resin according to claim 1 wherein the said salt is present in an amount in the range 0.05–10 weight per cent of the dry resin.

12. A thermally stable resin according to claim 1 wherein the resin is a 1-butene-$SO_2$ resin.

13. A thermally stable resin according to claim 1 wherein the resin is a 1-butene-acrylate-$SO_2$ resin.

14. A thermally stable resin according to claim 13 wherein the acrylate is methyl acrylate.

15. A thermally stable resin according to claim 13 wherein the said salt is present in an amount in the range 0.05–10 weight per cent of the dry resin.

16. A thermally stable resin composition comprising a 1-butene sulfur dioxide resin and as a stabilizer therefor a zinc salt of an ester of dithiophosphoric acid in an amount sufficient to impart thermal stability to the composition.

17. A thermally stable resin composition comprising a 1-butene sulfur dioxide resin and as a stabilizer therefor a magnesium salt of an ester of dithiophosphoric acid in an amount sufficient to impart thermal stability to the composition.

18. A thermally stable resin composition comprising 1-butene acrylate sulfur dioxide resin and as a stabilizer therefor a zinc salt of an ester of dithiophosphoric acid in an amount sufficient to impart thermal stability to the composition.

19. A thermally stable resin composition comprising 1-butene acrylate sulfur dioxide resin and as a stabilizer therefor a magnesium salt of an ester of dithiophosphoric acid in an amount sufficient to impart thermal stability to the composition.

20. A thermally stable resin composition comprising 1-butene acrylate sulfur dioxide resin and as a stabilizer therefor a lead salt of an ester of dithiophosphoric acid in an amount sufficient to impart thermal stability to the composition.

21. A thermally stable resin composition comprising an olefin-$SO_2$ resin and, as a stabilizer therefor, a zinc salt of diisopropyl dithiophosphate in an amount sufficient to impart thermal stability to the composition.

22. A thermally stable resin composition comprising an olefin-$SO_2$ resin and, as a stabilizer therefor, a zinc salt of di-n-octyl dithiophosphate in an amount sufficient to impart thermal stability to the composition.

23. A thermally stable heteropolymeric resin of a hydrocarbon containing monoolefinic unsaturation and sulfur dioxide containing a metal salt of an ester of dithiophosphoric acid in an amount effective to impart stability to the composition thus produced.

24. A thermally stable heteropolymeric resin of an unsaturated hydrocarbon compound containing aliphatic unsaturation and which will polymerize with sulfur dioxide to form said resin, and sulfur dioxide containing a zinc salt of an ester of dithiophosphoric acid in an amount effective to impart stability to the composition.

25. A composition according to claim 24 wherein the ester is the dihexyl ester.

26. A composition according to claim 24 wherein the ester is the di-n-octyl ester.

27. A composition according to claim 24 wherein the ester is the diisopropyl ester.

28. A thermally stable heteropolymeric resin of an unsaturated hydrocarbon compound containing aliphatic unsaturation and which will polymerize with sulfur dioxide to form said resin, and sulfur dioxide containing a magnesium salt of an ester of dithiophosphoric acid in an amount effective to impart stability to the composition.

29. A composition according to claim 28 wherein the ester is the di-n-octyl ester.

30. A thermally stable heteropolymeric resin of an unsaturated hydrocarbon compound containing aliphatic unsaturation and which will polymerize with sulfur dioxide to form said resin, and sulfur dioxide containing a lead salt of an ester of dithiophosphoric acid in an amount effective to impart stability to the composition.

31. A composition according to claim 30 wherein the ester is the di-n-octyl ester.

32. A thermally stable resin according to claim 13 wherein the acrylate is ethyl acrylate.

33. A thermally stable resin according to claim 13 wherein the acrylate is butyl acrylate.

34. A thermally stable resin according to claim 13 wherein the acrylate is octyl acrylate.

35. A method for the molding of a polysulfone resin, produced by polymerizing together an unsaturated organic compound containing aliphatic unsaturation and sulfur dioxide, without substantial decomposition thereof due to heat imparted thereto during said molding, which comprises intimately admixing with said resin prior to said molding step a metal salt of an ester of dithiophosphoric acid in an amount effective to impart stability against heat to the composition thus produced, and then heat molding said resin.

36. A method for the molding of a polysulfone resin, produced by polymerizing together an unsaturated organic compound containing aliphatic unsaturation and sulfur dioxide, without substantial decomposition thereof due to heat imparted thereto during said molding, which comprises intimately admixing with said resin prior to said molding step a metal salt of an ester of dithiophosphoric acid represented by the formula:

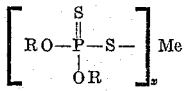

wherein Me is a metal selected from groups I–A, II–A, II–B and IV–B of the Mendeleeff Periodic Table of the elements, $x$ is equal to the valence of said metal; R is at least one member selected from the group consisting of an alkyl group, containing from 1–16 carbon atoms; an aryl group containing from 6–16 carbon atoms; a substituted aryl group, containing from 6–16 carbon atoms; a cycloalkyl group, containing not more than 16 carbons; and a substituted cycloalkyl group, containing not more than 16 carbon atoms in an amount sufficient to impart stability to the composition thus produced, and then heat molding said resin.

37. A production according to claim 5 wherein the stabilizer is a sodium salt of an ester of dithiophosphoric acid.

38. A production according to claim 5 wherein the stabilizer is a zinc salt of an ester of dithiophosphoric acid.

39. A production according to claim 5 wherein the stabilizer is a magnesium salt of an ester of dithiophosphoric acid.

40. A production according to claim 5 wherein the stabilizer is a lead salt of an ester of dithiophosphoric acid.

41. A production according to claim 36 in which the stabilizer is a sodium salt of an ester of dithiophosphoric acid.

42. A production according to claim 36 in which the stabilizer is a zinc salt of an ester of dithiophosphoric acid.

43. A production according to claim 36 in which the stabilizer is a magnesium salt of an ester of dithiophosphoric acid.

44. A production according to claim 36 in which the stabilizer is a lead salt of an ester of dithiophosphoric acid.

No references cited.